June 6, 1933. G. MAIURI ET AL Re. 18,859

ABSORPTION REFRIGERATING SYSTEM

Original Filed Nov. 20, 1930 2 Sheets-Sheet 1

INVENTORS.
Guido Maiuri
Raoul Felice Bossini
BY
Myatt & Drurell
ATTORNEY.

June 6, 1933. G. MAIURI ET AL Re. 18,859

ABSORPTION REFRIGERATING SYSTEM

Original Filed Nov. 20, 1930 2 Sheets-Sheet 2

INVENTORS.
Guido Maiuri
Raoul Felice Bossini
BY
A. Yates Dowell
ATTORNEY.

Reissued June 6, 1933 Re. 18,859

UNITED STATES PATENT OFFICE

GUIDO MAIURI AND RAOUL FELICE BOSSINI, OF LONDON, ENGLAND, ASSIGNORS, BY MESNE ASSIGNMENTS, TO ELECTROLUX SERVEL CORPORATION, OF NEW YORK, N. Y., A CORPORATION OF DELAWARE

ABSORPTION REFRIGERATING SYSTEM

Original No. 1,798,946, dated March 31, 1931, Serial No. 496,895, filed November 20, 1930, and in Great Britain April 18, 1929. Application for reissue filed January 25, 1933. Serial No. 653,488.

This invention relates to refrigerating systems of the absorption type and more particularly to a method of and apparatus for effecting circulation between the generator and absorber of a continuous absorption refrigerating system having all parts in open communication and operated solely by heat.

In general the object of the invention is to improve liquid circulation in absorption type refrigerating apparatus.

In apparatus of the type above referred to, circulation of liquid is usually effected by thermosiphonic action, for example by the provision of a heat pump utilizing the expulsion of refrigerant vapor to lift liquid in an ascending pipe. Heretofore the heating of thermosiphons has not been regulable independently of the control of the generator heating, whereas, this invention contemplates a separately controlled individual heating means for the thermosiphon element whereby, due to the independent control, improved circulation of absorption liquid is obtained.

According to this invention weak absorption liquid from the boiler is subjected to further heating to lift the liquid to a higher level from which it flows to the absorber by gravity. The weak absorption liquid may be heated in successive stages and, furthermore, the circulation of liquid may be controlled by regulating the heat to which the weak liquid is subjected. This invention also contemplates the lifting of weak absorption liquid by ebullition of the liquid after thermal expulsion of refrigerant vapor therefrom.

Figure 1:
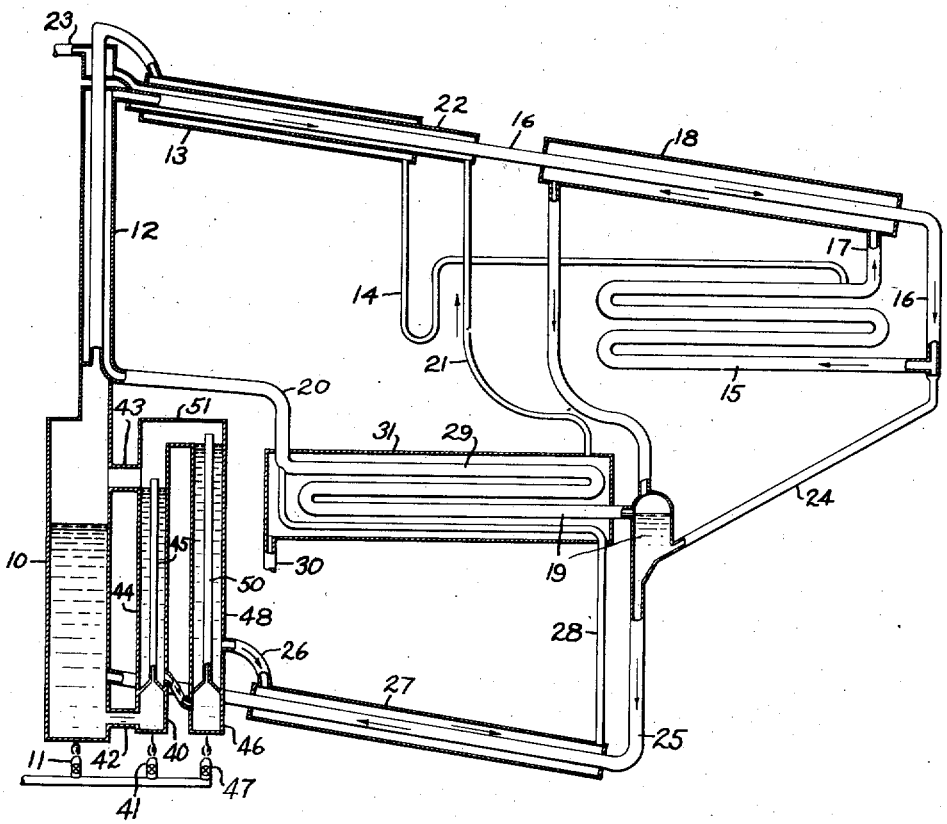
Figure 2:
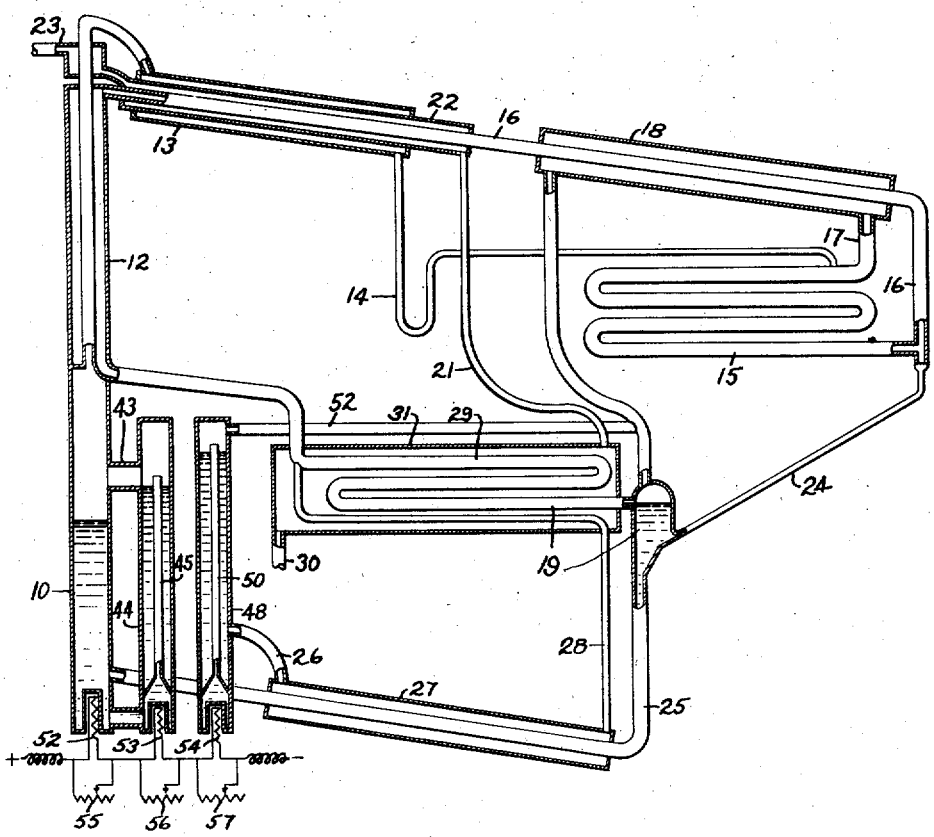

This invention will be readily understood by referring to the following description taken in connection with the accompanying drawings, in which, Fig. 1 is a diagrammatic view in vertical section of a refrigerating system contemplated by this invention; and Fig. 2, a diagrammatic view in vertical section of a refrigerating system including the generator shown in Fig. 1 modified according to this invention.

Referring to Fig. 1, a generator 10 containing a solution of ammonia and water is heated by any desired means such as gas burner 11. Ammonia vapor driven out of solution in the generator passes through rectifier 12 to a condenser 13 in which the vapor is cooled and liquefied. Liquid ammonia passes through a liquid seal 14 into the evaporator 15.

In the evaporator the refrigerant is evaporated and diffuses into inert gas which enters the evaporator through conduit 16, the inert gas passing in counterflow to the liquid refrigerant in the evaporator. The resulting gas mixture leaves the evaporator through conduit 17 and passes through a heat exchanger 18 in heat exchange relation with the inert gas flowing through conduit 16. From the heat exchanger 18 the gas mixture passes into the absorber 19 where the ammonia vapor is absorbed by the weak absorption liquid and the inert gas leaves by conduit 20 and returns through the outer jacket of rectifier 12 back to the conduit 16.

Circulation of the inert gas is effected in a known manner by heating the ascending column of gas in the rectifier 12 and cooling the descending column of gas in the conduit 16. The ascending column of gas is heated by the hot ammonia vapor from the generator 10 and the descending column of gas is cooled first by water from conduit 21 flowing in jacket 22 around the conduit 16 and going to waste through conduit 23, and then by the cold gas mixture from the evaporator passing through the jacket 18 around the conduit 16. A small pipe 24 is provided to remove any vapor condensed in conduit 16 and to conduct the same to absorber 19.

The strong liquor from the absorber 19 is returned to the generator through conduit 25 in heat exchange relation with the weak liquor being supplied to the absorber from the generator through conduit 26, jacket 27, and conduit 28 which communicates with the upper part of the absorber coil 29 which acts as the cooling surface of the absorber. The absorber is cooled by water from conduit 30 flowing around the coil 29 in jacket 31, then discharging through conduit 21.

A secondary generator 40 may be heated by a heating element 41 and is connected to the bottom of the main generator by conduit 42 and communicates at its upper portion with the vapor space in the main generator through conduit 43. Weak liquor is lifted to a higher level in chamber 44 of this secondary generator through conduit 45 in a well known manner due to formation of gas by the heat from heating element 41. In secondary generator 46 heated by a heating element 47, weak absorption liquid from chamber 44 in the first secondary generator 40 is lifted through conduit 50 to a still higher level in chamber 48 due to formation of gas by heat from heating element 47, from which the weak liquor flows to the absorber through conduit 26. The pressures in the generators are equal but the liquid becomes successively weaker in each succeeding generator and the percentage of absorption liquid which evaporates in each generator corresponds to the strength of the liquid therein and is greatest in the generator in which the liquid is weakest. The raising of the level of the absorption liquid in the secondary generators is accomplished by the thermosiphonic action of both the rising ammonia vapor driven out of solution by heat and vapor produced by ebullition of the absorption liquid.

In the last secondary generator the absorption liquid may be so weak that the vapors evolved comprises a relatively high percentage of absorption liquid vapor, in which case it may be desirable to convey the vapor issuing from the conduit 50 in the last generator 46 directly into the absorber instead of allowing it to pass through the conduit 51 to the rectifier. This may be done as shown in Fig. 2 which shows the main generator and secondary generators of Fig. 1 modified and connected in the same system shown in Fig. 1. The upper part of chamber 48 of the last secondary generator 46 is not connected to the vapor space above the main generator 38 but is connected through a conduit 52 directly to the absorber 19. The liquid circulation between the absorber and the generator may be controlled by regulating the heating of the secondary generators. In this modification electric heating elements 52, 53, and 54 are shown for heating the generators, instead of gas burners as in Fig. 1, and are separately controlled by rheostats 55, 56, and 57 respectively.

It will be obvious to those skilled in the art that various other changes may be made in the construction and arrangement without departing from the spirit of the invention and therefore the invention is not limited to what is shown in the drawings and described in the specification but only as indicated in the appended claims.

We claim:

1. In a refrigerating system of the absorption type the method of circulating liquid between the absorber and generator which comprises, separating weak absorption liquid from the generator, heating the weak absorption liquid thus separated in successive steps to expel vapor therefrom to successively raise the level thereof, conducting vapor thus expelled into the presence of vapor expelled in the generator, conducting the weak absorption liquid to the absorber by gravity, and returning enriched absorption liquid from the absorber to the generator by gravity.

2. In a refrigerating system of the absorption type the method of circulating liquid between the generator and absorber which comprises, separating weak absorption liquid from the generator, heating the weak absorption liquid thus separated to expel refrigerant vapor therefrom to raise the level thereof, conducting the vapor thus expelled into the presence of vapor expelled in the generator, further heating the weak absorption liquid to further raise the level thereof, conducting vapor resulting from the last heating to the absorber, conducting the weak absorption liquid to the absorber by gravity, and returning the enriched absorption liquid from the absorber to the generator by gravity.

3. An absorption refrigerating apparatus having all parts in open fiuid communication including a generator containing a solution of refrigerant in an absorption liquid, heating means for said generator to expel refrigerant vapor from the solution contained therein, a condenser for liquefying the refrigerant vapor thus expelled, a refrigerating element, means for conducting liquid refrigerant from the condenser to said element, an absorber, means for conducting vaporized refrigerant from said element to said absorber, a plurality of thermosiphon pumps for successively raising the level of the weak absorption liquid from said generator, separate heating means for each of said pumps, a conduit for weak absorption liquid from said pumps to the absorber, a conduit for refrigerant vapor from said pumps to the condenser, and an enriched absorption liquid return connection from the absorber to the generator.

4. Absorption refrigerating apparatus of the pressure equalized type including a generator, an absorber, a thermosiphon pump for raising the level of weak absorption liquid from the generator, separate heating means for said generator and said pump, means for conducting refrigerant vapor from said pump into the presence of vapor expelled in the generator, a heat pump for further raising the weak absorption liquid by ebullition thereof, heating means for last said pump, means for conducting vapor from last said pump to the absorber, a conduit for conducting weak absorption liquid raised by last said pump to the absorber, and means for returning enriched absorption liquid from the absorber to the generator.

5. In absorption type refrigerating apparatus having a generator and absorber interconnected for the circulation of absorption liquid therebetween, a thermosiphon element in the path of circulation from the generator to the absorber, separately controlled individual heating means for the generator and said element, and means to conduct vapor produced in said element into the presence of vapor from the generator.

6. Refrigerating apparatus including a generator, an absorber, a thermosiphon element having separate lower and upper chambers connected by a thermosiphon conduit, separately controlled individual heating means for the generator and said element, means to conduct absorption liquid in series through the absorber, the generator, the lower and upper chambers respectively, and means to conduct vapor from said upper chamber into the presence of vapor from the generator.

7. In absorption type refrigerating apparatus having a generator and absorber interconnected for the circulation of absorption liquid therebetween, a plurality of thermosiphon elements in series in the path of circulation between said generator and absorber, means to conduct vapor produced in one of said elements into the presence of vapor from the generator, and means to conduct vapor produced in another of said elements to the absorber.

8. Refrigerating apparatus including a generator, an absorber, a plurality of thermosiphon elements each having separate lower and upper chambers connected by a thermosiphon conduit, means to conduct absorption liquid in series through the absorber, the generator, the lower chamber of one of the thermosiphon elements, the upper chamber of said one of the thermosiphon elements, the lower chamber of another of the thermosiphon elements, and the upper chamber of the last said thermosiphon element, and means to conduct vapor from the upper chambers of the thermosiphon elements.

9. Refrigerating apparatus including a generator, an absorber, a plurality of thermosiphon elements each having separate lower and upper chambers connected by a thermosiphon conduit, means to conduct liquid in series through the absorber, the generator, the lower chamber of one of the thermosiphon elements, the upper chamber of said one of the thermosiphon elements, the lower chamber of another of the thermosiphon elements, and the upper chamber of the last said thermosiphon element, separately controlled individual heating means for the generator and each of said thermosiphon elements, and means to conduct vapor from the upper chambers of the thermosiphon elements.

10. Refrigerating apparatus including a generator, an absorber, a plurality of thermosiphon elements each having separate lower and upper chambers connected by a thermosiphon conduit, means to conduct liquid in series through the absorber, the generator, the lower chamber of one of the thermosiphon elements, the upper chamber of said one of the thermosiphon elements, the lower chamber of another of the thermosiphon elements and the upper chamber of the last said thermosiphon element, separately controlled individual heating means for the generator and each of said thermosiphon elements, means to conduct vapor from the upper chamber of one of said elements into the presence of vapor from the generator, and means to conduct vapor from the upper chamber to another of said elements to the absorber.

GUIDO MAIURI.
RAOUL FELICE BOSSINI.